(12) United States Patent
Iwamoto et al.

(10) Patent No.: US 7,763,124 B2
(45) Date of Patent: Jul. 27, 2010

(54) STEEL MATERIAL WITH EXCELLENT ROLLING FATIGUE LIFE AND METHOD OF PRODUCING THE SAME

(75) Inventors: Takashi Iwamoto, Kurashiki (JP); Akihiro Matsuzaki, Kurashiki (JP); Kazuhiko Ohno, Kurashiki (JP); Masao Goto, Habikino (JP); Hisashi Harada, Kashiwara (JP); Hisato Nishisaka, Kashiwara (JP)

(73) Assignees: JFE Steel Corporation, Tokyo (JP); Koyo Seiko Co., Ltd., Osaka-Shi (JP)

( * ) Notice: Subject to any disclaimer, the term of this patent is extended or adjusted under 35 U.S.C. 154(b) by 166 days.

(21) Appl. No.: 10/547,252

(22) PCT Filed: Apr. 14, 2004

(86) PCT No.: PCT/JP2004/005341

§ 371 (c)(1),
(2), (4) Date: Sep. 12, 2005

(87) PCT Pub. No.: WO2004/092434

PCT Pub. Date: Oct. 28, 2004

(65) Prior Publication Data

US 2006/0081314 A1 Apr. 20, 2006

(30) Foreign Application Priority Data

Apr. 16, 2003 (JP) ............................. 2003-111560

(51) Int. Cl.
| | |
|---|---|
| C22C 38/22 | (2006.01) |
| C22C 38/24 | (2006.01) |
| C22C 38/26 | (2006.01) |
| C22C 38/40 | (2006.01) |
| C21D 9/36 | (2006.01) |

(52) U.S. Cl. .................... 148/334; 148/335; 148/906; 148/659; 148/663; 384/625; 384/912

(58) Field of Classification Search ......... 148/334–336, 148/320, 906, 663, 59, 572, 659, 662, 664; 420/99–101, 108–111, 105; 384/625, 912

See application file for complete search history.

(56) References Cited

U.S. PATENT DOCUMENTS

| | | | | | |
|---|---|---|---|---|---|
| 3,663,314 | A | * | 5/1972 | Monma et al. | 148/333 |
| 5,733,388 | A | * | 3/1998 | Kurebayashi et al. | 148/334 |
| 5,788,923 | A | * | 8/1998 | Hayashi et al. | 420/104 |
| 6,383,317 | B1 |   | 5/2002 | Bellus et al. | |
| 6,602,360 | B2 | * | 8/2003 | Takemura et al. | 148/333 |

FOREIGN PATENT DOCUMENTS

| | | | |
|---|---|---|---|
| EP | 0 458 646 A1 | | 11/1991 |
| EP | 1 114 199 A1 | | 7/2000 |
| EP | 1 048 744 A1 | | 11/2000 |
| EP | 1 114 199 B1 | | 10/2002 |
| JP | 48007827 | * | 8/1976 |
| JP | 1-306542 A | | 12/1989 |
| JP | 3-126839 A | | 5/1991 |
| JP | 6-287691 A | | 10/1994 |
| JP | 6-293939 A | | 10/1994 |
| JP | 07-316728 A | | 12/1995 |
| JP | 09-87805 | * | 3/1997 |
| JP | 2000-204445 A | | 7/2000 |
| JP | 2001-294972 | * | 10/2001 |
| JP | 2001-294972 A | | 10/2001 |
| JP | 2002-294337 A | | 10/2002 |

OTHER PUBLICATIONS

Computer Translation of JP 2001-294972.
The Making, Shaping and Treating of Steel, Lankford et al; US Steel 10$^{th}$ Edition 1985 (pp. 954-955).

* cited by examiner

*Primary Examiner*—Deborah Yee
(74) *Attorney, Agent, or Firm*—Frishauf, Holtz, Goodman & Chick, P.C.

(57) ABSTRACT

Provided are a steel having excellent rolling contact fatigue life and the manufacturing method thereof. The steel consists essentially of 0.7 to 1.1% C, 0.2 to 2.0% Si, 0.4 to 2.5% Mn, 1.6 to 4.0% Cr, 0.1% or more and less than 0.5% Mo, 0.010 to 0.050% Al, bymass, and balance of Fe and inevitable impurities, is treated by quenching and tempering, has residual cementite grain sizes ranging from 0.05 to 1.5 μm, and has prior-austenite grain sizes of 30 μm or smaller. When the steel is used to bearing steel, the bearing life extends even under service in more severe environments.

15 Claims, No Drawings

STEEL MATERIAL WITH EXCELLENT ROLLING FATIGUE LIFE AND METHOD OF PRODUCING THE SAME

This application is the United States national phase application of International Application PCT/JP2004/005341 filed Apr. 14, 2004.

TECHNICAL FIELD

The present invention relates to a steel used to antifriction bearings such as roller bearings and ball bearings, and other devices, specifically to a steel having excellent rolling contact fatigue life even under service in more severe environments, and to a method for manufacturing thereof.

BACKGROUND ART

Base materials for antifriction bearings used in automobiles, industrial machines, and the like have been occupied by high carbon chromium bearing steel SUJ2 specified by JIS G4805.

In general, bearing steels are requested to have long rolling contact fatigue life as an important characteristic. In the past, however, the most important variable that affects the rolling contact fatigue life of bearing steels was the non-metallic inclusions in steel. To this point, for example, JP-A-1-306542, (the term "JP-A" referred to herein signifies the "Japanese Patent Laid-Open Publication"), and JP-A-3-126839 disclose a method to improve the rolling contact fatigue life by decreasing the amount of oxygen in steel and by controlling the amount, shape, and size of the non-metallic inclusions.

Various studies conducted by the inventors of the present invention about the rolling contact fatigue life of bearing steels, however, derived the finding that, under service in more severe environments such as heavy load and high temperature, the rolling contact fatigue life cannot fully be improved solely by controlling the amount, shape, and size of non-metallic inclusions, as in the above method, because of the phenomena described below.

That is, with increase in the severity of working environment of bearing, a white microstructure-varied layer appears in the lower layer portion (surface layer section) of the contact face of the bearing steel owing to the shearing stress generated by the contact of the rolling element with the inner/outer races of the bearing, which varied layer gradually develops with increase in the number of rotations, thereby finally inducing fatigue flaking to shorten the rolling contact fatigue life. In particular, temperature increase under high face pressure (size reduction) which is severer working environment decreases the number of rotations before forming the microstructure-varied layer, thus significantly shortens the rolling contact fatigue life.

Consequently, to prevent the decrease in the rolling contact fatigue life accompanied with the increase in severity of working environment, sole relating art of controlling only the amount, shape, and size of non-metallic inclusions is not satisfactory, and the prevention of changes in microstructure with time is requested.

As the bearing steels that can suppress the changes in microstructure under cyclic loads inducing the heavy load rolling contact fatigue, the inventors of the present invention provided a bearing steel containing 0.5 to 1.5% C, more than 2.5% and not more than 8.0% Cr, 0.001 to 0.015% Sb, 0.002% or less O, by weight, and balance of Fe and inevitable impurities, and a bearing steel containing, adding to the above components, more than 0.5% and not more than 2.5% Si, 0.05 to 2.0% Mn, 0.05 to 0.5% Mo, 0.005 to 0.07% Al, and the like, by weight, in JP-A-6-287691. These bearing steels provide improved $B_{50}$ heavy load rolling contact fatigue life (the number of load cycles in the rolling contact fatigue life test inducing the microstructure-varied layer shows flaking at the 50% cumulative braking probability).

Currently, however, the working environment of bearings has become severer than that at the time of application of JP-A-6-287691, and sole specification of chemical composition cannot attain satisfactory rolling contact fatigue life. Therefore, steels for bearings assuring further excellent rolling contact fatigue life are wanted.

DISCLOSURE OF THE INVENTION

Through various studies, the inventors of the present invention found a steel having excellent rolling contact fatigue life to prolong the bearing life even in severer working environment than ever, by specifying the microstructure of the steel in the working state, in a narrow sense.

That is, the steel having excellent rolling contact fatigue life contains 0.7 to 1.1% C, 0.2 to 2.0% Si, 0.4 to 2.5% Mn, 1.6 to 4.0% Cr, 0.1% or more and less than 0.5% Mo, 0.010 to 0.050% Al, by mass, and balance of Fe and inevitable impurities, which steel is treated by quenching and tempering, has residual cementite grain sizes ranging from 0.05 to 1.5 μm, and has prior-austenite grain sizes of 30 μm or smaller.

The steel having excellent rolling contact fatigue life is manufactured by the steps of: spheroidizing a steel having above composition by heating to temperatures ranging from 750° C. to 850° C., and then by cooling to 700° C. or lower temperature at 0.015° C./s or lower cooling rate; and quenching and tempering the spheroidized steel.

EMBODIMENTS OF THE INVENTION

The inventors of the present invention studied the changes in microstructure of bearing steels under cyclic loads under service in more severe environments, and derived the following findings.

1) The main causes of changes in microstructure are the stress concentration to a hard portion of steel and the diffusion of carbon (C) in the peripheral zone of the hard portion. Accordingly, relief of concentrated stress or suppression of C diffusion can suppress the changes in microstructure.

2) Suppressing the C diffusion in steel can be attained by refining the austenite (hereinafter referred to as "γ") grains in the heating step during quenching and by adjusting the grain size of cementite left after the quenching and tempering to a range from 0.05 to 1.5 μm.

3) For above-described high carbon bearing steel SUJ2 specified by JIS G4805, there may be left a coarse carbide, called the "eutectic carbide", having 5 μm or larger grain size after quenching and tempering caused by the influence of coarse carbide crystallized during casting a molten steel. The eutectic carbide becomes the source of stress concentration, and enhances the changes in microstructure. Furthermore, spheroidal carbide formed during the spheroidization also becomes the source of stress concentration by enlarging the grain size, thereby enhancing the changes in microstructure.

The present invention was perfected on the basis of above findings, and the detail of the present invention is described in the following.

(I) Chemical Composition

C

Carbon forms a solid solution in the matrix of steel, thus strengthening martensite, assuring hardness after quenching and tempering, and extending the rolling contact fatigue life. To attain these effects, the C content has to be adjusted to 0.7% by mass or more. If, however, the C content exceeds 1.1% by mass, the formation of coarse carbide such as eutectic carbide is induced, and the changes in microstructure caused by the C diffusion in steel is enhanced, thereby decreasing the rolling contact fatigue life. Therefore, the C content is specified to a range from 0.7 to 1.1% by mass.

Si

Silicon acts as a deoxidizing agent for steel, and forms a solid solution in the ground of steel to suppress the reduction in strength during tempering after quenching. In addition, Si suppresses the changes in microstructure under rolling load environments. To attain these effects, the Si content has to be adjusted to 0.2% by mass or more. If, however, the Si content exceeds 2.0% by mass, the forgeability, machinability, and other properties are significantly deteriorated. Consequently, the Si content is specified to a range from 0.2 to 2.0% by mass.

Mn

Manganese acts as a deoxidizing agent for steel, and is effective in decreasing the oxygen content. Manganese also increases the quenchability to improve toughness and strength of martensite which is the ground of steel, thus improves the rolling contact fatigue life. Furthermore, Mn stabilizes cementite to suppress the changes in microstructure. To attain these effects, the Mn content has to be adjusted to 0.4% by mass or more. If, however, the Mn content exceeds 2.5% by mass, the forgeability, machinability, and other properties are significantly deteriorated. Consequently, the Mn content is specified to a range from 0.4 to 2.5% by mass.

Cr

Chromium stabilizes cementite to suppress the C diffusion in steel, and also suppresses the growth of cementite to prevent stress concentration, thereby improving the rolling contact fatigue life. To attain these effects, the Cr content has to be adjusted to 1.6% by mass or more. If, however, the Cr content exceeds 4.0% by mass, the amount of solid solution of C in the martensite is decreased to decrease the hardness after quenching and tempering, thereby decreasing the rolling contact fatigue life. Therefore, the Cr content is specified to a range from 1.6 to 4.0% by mass.

Mo

Molybdenum forms a solid solution in the ground of steel to suppress the decrease in strength during tempering after quenching. In addition, Mo improves the hardness after quenching and tempering, and improves the rolling contact fatigue life. Furthermore, Mo suppresses the changes in microstructure through the stabilization of carbide. To attain these effects, the Mo content has to be adjusted to 0.1% by mass or more. Even if, however, Mo is added to 0.5% by mass or more, these effects saturate and the cost increases. Therefore, the Mo content is specified to a range from 0.1% by mass or more and less than 0.5% by mass.

Al

Aluminum is necessary as a deoxidizing agent for steel. Aluminum bonds with N in the steel to refine the prior-γ grains after quenching and tempering, thus improving the rolling contact fatigue life. To attain the effect, the Al content has to be adjusted to 0.010% by mass or more. If, however, the Al content exceeds 0.050% by mass, excess AlN precipitate shortens the rolling contact fatigue life. Consequently, the Al content is specified to a range from 0.010 to 0.050% by mass.

Adding to those elements, it is preferable to further add at least one element selected from the group consisting of 0.5 to 2.0% Ni, 0.05 to 1.00% V, 0.005 to 0.50% Nb, and 0.0010 to 0.0050% Sb, by mass, because of the reason given below.

Ni

Nickel is added at need because it forms a solid solution in the ground of steel to suppress the decrease in the strength after tempering. To attain satisfactory effect, the Ni content has to be adjusted to 0.5% by mass or more. If, however, the Ni content exceeds 2.0% by mass, large amount of residual γ appears to decrease the strength after quenching and tempering. Therefore, the Ni content is specified to a range from 0.5 to 2.0% by mass.

V

Vanadium is added at need because it forms a stable carbide to increase the hardness and to suppress the changes in microstructure, thereby improving the rolling contact fatigue life. To attain satisfactory effect, the V content has to be adjusted to 0.05% by mass or more. If, however, the V content exceeds 1.00% by mass, the amount of solid solution C decreases to decrease the hardness after quenching and tempering. Consequently, the V content is specified to a range from 0.05 to 1.00% by mass.

Nb

Similar with V, Nb is added at need because it forms a stable carbide to increase the hardness and to suppress the changes in microstructure, thus improving the rolling contact fatigue life. To attain satisfactory effect, the Nb content has to be adjusted to 0.005% by mass or more. Even if, however, the Nb content exceeds 0.50% by mass, the effect saturates. Therefore, the Nb content is specified to a range from 0.005 to 0.50% by mass.

Sb

Antimony is added at need because it suppresses the decarbonizing during heat treatment and refines prior-γ grains after quenching and tempering, thus improving the rolling contact fatigue life. To attain satisfactory effect, the Sb content has to be adjusted to 0.0010% by mass or less. If, however, the Sb content exceeds 0.0050% by mass, the effect saturates, and the hot-workability and the toughness deteriorate. Therefore, the Sb content is specified to a range from 0.0010 to 0.0050% by mass.

(II) Grain Size of Residual Cementite

The high carbon steels for bearings are treated by quenching and tempering. After treatment, residual cementite which existed before the quenching remains in the steel. As described before, the residual cementite suppresses the C diffusion in steel and suppresses the changes in microstructure in the bearing steel caused by the cyclic loads under service in more severe environments. If, however, the average grain size of residual cementite is smaller than 0.05 μm, the ratio of the surface area to the volume of cementite increases to enhance the elution of C into the ground of steel, which fails to attain satisfactory effect of suppressing C diffusion. If the average grain size thereof exceeds 1.5 μm, the stress concentration at the interface between the residual cementite and the ground of steel increases, which enhances the changes in microstructure. Therefore, the grain size of residual cementite after quenching and tempering has to be in a range from 0.05 to 1.5 μm.

(III) Prior-γ Grain Size

Adding to the above-described suppression of changes in microstructure, the suppression of propagation of cracks generated by rolling contact fatigue is also effective in improving the rolling contact fatigue life. That improvement under service in more severe environments requires the prior-γ grain size after quenching and tempering to specify to 30 μm or smaller.

(IV) Manufacturing Method

According to the present invention, the starting material adopts a steel bar which is prepared by casting a steel having the chemical composition within the range of the present invention, described before, and by, for example, applying continuous casting to form a strand, then by hot-rolling the strand. Thus prepared steel bar is treated by normalizing under ordinary condition, and is heated to temperatures ranging from 750° C. to 850° C., then is treated by spheroidizing to cool to 700° C. or lower temperature at cooling rates of 0.015° C./s or less, followed by quenching and tempering. Through the spheroidization, the grain size of residual cementite after quenching and tempering can be adjusted to a range from 0.05 to 1.5 μm. If the heating temperature during the spheroidizing exceeds 850° C., the spheroidized cementite becomes coarse, and the residual cementite after quenching and tempering also becomes coarse, and further a new stratified cementite is formed during cooling after heating. If the heating temperature is below 750° C., the pearlite existed before the spheroidization is left behind, which hinders to form the wanted residual cementite.

The quenching and tempering treatments are conducted under a condition applied normally in this field. In particular, when the heating temperature during quenching is below 800° C., the formation of solid solution of the spheroidized cementite into the austenite matrix does not fully proceed, and sufficient hardness after quenching and tempering cannot be attained, and also the residual cementite becomes coarse. Inversely, if the heating temperature exceeds 950° C., excess solid solution of cementite appears, and the austenite grains become coarse. Therefore, to obtain the wanted residual cementite after quenching and tempering and to bring the prior-γ grain size to 30 μm or smaller, it is important to adjust the heating temperature during quenching to a range from 800° C. to 950° C. Although the volume percentage of cementite after quenching and tempering varies mainly with the amount of C, the composition range according to the present invention gives the percentages thereof from 3 to 25%.

EXAMPLES

Steels of Sample Nos. 1 to 25 having the respective chemical compositions given in Table 1 were refined in converter, and were continuously cast to obtain the respective strands. The chemical compositions of Sample Nos. 1 to 7, given in Table 1, were outside the range of the present invention. That is, Sample No. 1 was a conventional steel equivalent to SUJ2 of JIS G4805, Sample No. 2 was outside the range of the present invention in C content, Sample No. 3 was outside the range of the present invention in Si content, Sample No. 4 was outside the range of the present invention in Mn content, Sample No. 5 was outside the range of the present invention in Cr content, Sample No. 6 was outside the range of the present invention in Mo content, and Sample No. 7 was outside the range of the present invention in Al content. Thus obtained strands were annealed at 1240° C. for 30 hours, followed by hot-rolled to steel rods having 65 mm in diameter.

Specimens were sampled from each of thus prepared steel bars by machining at a position equivalent to ¼ of the diameter thereof: a cylindrical specimen having 15 mm in diameter and 20 mm in length, and a specimen for determining the rolling contact fatigue life (hereinafter referred to as the "rolling contact fatigue test specimen"). These specimens were subjected to heat treatment in an order of: normalizing, spheroidizing, quenching, and tempering. The spheroidizing was conducted by cooling the specimens from the respective heating temperatures given in Table 1 to 650° C. at cooling rates from 0.004 to 0.020° C./s, followed by allowing standing to cool. For the rolling contact fatigue test specimen, to completely eliminate the decarbonized layer, the specimen was further machined to 1 mm or more depth from the surface, and then was lapped to bring the size of the specimen to 12 mm in diameter and 22 mm in length.

Each cylindrical specimen was cut in the axial direction. The cut face was corroded sequentially by a picric acid alcohol solution and a nitric acid alcohol solution. The resulted microstructure was observed, and was processed by image analysis to determine the average grain size of the residual cementite and the average prior-γ grain size.

Each rolling contact fatigue test specimen was subjected to rolling contact fatigue test using a radial type rolling contact fatigue life tester under a condition of 5880 MPa of Hertz maximum contact stress and about 46500 cpm of the number of repeated stresses. The result of the rolling contact fatigue life test was plotted on a probability paper assuming that what is called the "Weibull distribution" is established. The result was evaluated as a ratio to the average life of Sample No. 1 of conventional steel, (above-given $B_{50}$ heavy load rolling contact fatigue life). To attain longer rolling contact fatigue life under severer working environment than ever, the ratio is required to be 10 or more.

The result is given in Table 1.

Sample Nos. 9 to 18 and Nos. 20 to 25, which had chemical compositions within the range of the present invention, and which had both the grain size of residual cementite and the prior-γ grain size within the range of the present invention, showed high $B_{50}$ values by 10 times or more that of Sample No. 1 of conventional steel. Consequently, Sample Nos. 9 to 18 and Nos. 20 to 25 have excellent rolling contact fatigue life even under severer working environments than ever.

For Sample No. 10, Sample Nos. 10b and 10c which applied heating temperatures during quenching outside the range of the present invention could not attain the wanted grain size of residual cementite and prior-γ grain size, and the $B_{50}$ value was significantly small.

Samples Nos. 2 to 7, which had chemical compositions outside the range of the present invention gave $B_{50}$ values equal or smaller than that of Sample No. 1 of conventional steel. In particular, Sample No. 5 which had small Cr amount gave the grain size of residual cementite over 1.5 μm, and Sample No. 7 which had small Al amount gave the prior-γ grain size over 30 μm, and gave significantly small $B_{50}$ value.

Sample No. 8 which had more than 1.5 μm of grain size of residual cementite, though the chemical composition was within the range of the present invention, and Sample No. 19 which gave less than 0.05 μm of grain size of residual cementite, though the chemical composition was within the range of the present invention, gave larger $B_{50}$ value than that of Sample No. 1 of conventional steel. However, the ratio of their high $B_{50}$ values to the $B_{50}$ value of Sample No. 1 was about 3.8 at the maximum, which ratio level is not sufficient.

TABLE 1

| Sample No. | Chemical composition (mass %) | | | | | | | | | | Spheroidizing temp. °C. |
|---|---|---|---|---|---|---|---|---|---|---|---|
| | C | Si | Mn | Cr | Mo | Al | Ni | V | Nb | Sb | |
| 1 | 1.00 | 0.25 | 0.45 | 1.35 | 0.01 | 0.030 | | | | | 790 |
| 2 | 0.58 | 0.24 | 0.44 | 2.00 | 0.44 | 0.033 | | | | | 790 |
| 3 | 0.98 | 0.05 | 0.47 | 2.00 | 0.43 | 0.034 | | | | | 790 |
| 4 | 0.99 | 0.26 | 0.25 | 2.01 | 0.42 | 0.030 | | | | | 790 |
| 5 | 1.00 | 0.25 | 0.44 | 0.73 | 0.45 | 0.031 | | | | | 790 |
| 6 | 0.97 | 0.25 | 0.45 | 2.00 | 0.03 | 0.031 | | | | | 790 |
| 7 | 1.00 | 0.24 | 0.46 | 2.01 | 0.43 | 0.005 | | | | | 790 |
| 8 | 1.03 | 0.97 | 0.46 | 1.98 | 0.44 | 0.033 | | | | | 880 |
| 9 | 1.03 | 0.97 | 0.46 | 1.98 | 0.44 | 0.033 | | | 0.193 | | 790 |
| 10 | 0.98 | 0.98 | 0.44 | 2.00 | 0.45 | 0.033 | | | | | 790 |
| 10b | 0.98 | 0.98 | 0.44 | 2.00 | 0.45 | 0.033 | | | | | 790 |
| 10c | 0.98 | 0.98 | 0.44 | 2.00 | 0.45 | 0.033 | | | | | 790 |
| 11 | 1.01 | 0.24 | 0.45 | 2.01 | 0.46 | 0.033 | | | | | 780 |
| 12 | 1.00 | 0.25 | 0.45 | 2.00 | 0.46 | 0.032 | 1.53 | | | | 780 |
| 13 | 0.98 | 1.00 | 0.44 | 1.97 | 0.42 | 0.033 | | 0.48 | | | 790 |
| 14 | 1.00 | 0.24 | 0.46 | 3.51 | 0.45 | 0.003 | | | | | 800 |
| 16 | 1.01 | 1.47 | 0.46 | 2.00 | 0.46 | 0.030 | | | | | 800 |
| 17 | 0.71 | 1.00 | 0.46 | 2.02 | 0.46 | 0.033 | | | | | 770 |
| 18 | 0.71 | 0.98 | 0.46 | 3.50 | 0.45 | 0.031 | | | | | 770 |
| 19 | 0.71 | 0.98 | 0.46 | 3.50 | 0.45 | 0.031 | | | | | 770 |
| 20 | 1.00 | 1.00 | 2.00 | 2.00 | 0.45 | 0.034 | | | | | 790 |
| 21 | 1.01 | 0.99 | 0.45 | 2.03 | 0.46 | 0.032 | | | | 0.0025 | 790 |
| 22 | 1.00 | 1.00 | 0.44 | 2.01 | 0.45 | 0.030 | | 1.02 | 0.35 | | 790 |
| 23 | 1.00 | 0.61 | 1.20 | 2.72 | 0.33 | 0.032 | | | 0.035 | | 800 |
| 24 | 0.85 | 1.80 | 0.85 | 1.98 | 0.48 | 0.031 | 0.63 | | | 0.0018 | 780 |
| 25 | 1.02 | 1.70 | 0.45 | 3.80 | 0.44 | 0.045 | | | | 0.0031 | 810 |

| Sample No. | Cooling rate °C./s | Heating temp. during quenching °C. | Residual θ grain size μm | Prior-γ grain size μm | B50 life ratio | Remark |
|---|---|---|---|---|---|---|
| 1 | 0.006 | 860 | 0.61 | 24.8 | 1 | Conventional example |
| 2 | 0.004 | 860 | 0.31 | 22.9 | 0.6 | Comparative example |
| 3 | 0.008 | 860 | 0.34 | 21.4 | 0.8 | Comparative example |
| 4 | 0.006 | 860 | 0.36 | 23.5 | 1.2 | Comparative example |
| 5 | 0.007 | 860 | 1.70 | 26.1 | 0.2 | Comparative example |
| 6 | 0.009 | 860 | 0.36 | 22.7 | 1.2 | Comparative example |
| 7 | 0.008 | 860 | 0.34 | 70.3 | 0.3 | Comparative example |
| 8 | 0.006 | 860 | 3.00 | 21.8 | 3.8 | Comparative example |
| 9 | 0.007 | 860 | 0.35 | 21.8 | 16.7 | Conventional example |
| 10 | 0.005 | 860 | 0.35 | 21.3 | 17.1 | Conventional example |
| 10b | 0.005 | 980 | 0.04 | 43.5 | 0.4 | Comparative example |
| 10c | 0.005 | 790 | 1.5 | 15.3 | 0.2 | Comparative example |
| 11 | 0.008 | 860 | 0.35 | 21.7 | 14.4 | Conventional example |
| 12 | 0.007 | 860 | 0.35 | 19.6 | 17.4 | Conventional example |
| 13 | 0.009 | 860 | 0.34 | 21.9 | 17.1 | Conventional example |
| 14 | 0.008 | 920 | 0.19 | 19.2 | 21.0 | Conventional example |
| 16 | 0.008 | 860 | 0.35 | 23.3 | 18.0 | Conventional example |
| 17 | 0.008 | 850 | 0.32 | 22.3 | 17.8 | Conventional example |
| 18 | 0.005 | 900 | 0.18 | 20.5 | 23.8 | Conventional example |
| 19 | 0.020 | 900 | 0.04 | 21.0 | 1.1 | Comparative example |
| 20 | 0.006 | 860 | 0.27 | 20.0 | 20.2 | Conventional example |
| 21 | 0.006 | 860 | 0.34 | 14.3 | 21.0 | Conventional example |
| 22 | 0.006 | 860 | 0.34 | 21.2 | 18.8 | Conventional example |
| 23 | 0.004 | 830 | 0.23 | 20.2 | 19.8 | Conventional example |
| 24 | 0.008 | 850 | 0.31 | 15.6 | 24.7 | Conventional example |
| 25 | 0.007 | 900 | 0.17 | 10.4 | 34.2 | Conventional example |

θ: cementite

The invention claimed is:

1. A steel having excellent rolling contact fatigue life, consisting essentially of 0.7 to 1.1% C, 0.61 to 2.0% Si, 0.4 to 2.5% Mn, 3.5 to 4.0% Cr, 0.33% or more and less than 0.5% Mo, 0.010 to 0.050% Al, by mass, optionally at least one element selected from the group consisting of 0.5 to 2.0% Ni, 0.05 to 1.00% V, 0.005 to 0.50% Nb and 0.0010 to 0.0050% Sb, by mass and a balance of Fe and inevitable impurities; having a martensite-based microstructure caused by quenching and tempering; and having residual cementite grains of an average grain size ranging from 0.05 to 1.5 μm, and prior-austenite grains of an average grain size of 30 μm or smaller.

2. A method for manufacturing steel having excellent rolling contact fatigue life, comprising the steps of:

spheroidizing annealing a steel consisting essentially of 0.7 to 1.1% C, 0.61 to 2.0% Si, 0.4 to 2.5% Mn, 3.5 to 4.0% Cr, 0.33% or more and less than 0.5% Mo, 0.010 to 0.050% Al, by mass, optionally at least one element selected from the group consisting of 0.5 to 2.0% Ni, 0.05 to 1.00% V, 0.005 to 0.50% Nb and 0.0010 to 0.0050% Sb, by mass and a balance of Fe and inevitable impurities, by heating to temperatures ranging from 750° C. to 850° C., and then by cooling to 700° C. or a lower temperature at a cooling rate of 0.004 to 0.015° C./s to produce a spheroidizing-annealed steel;

and heating to 800° C. to 950° C., quenching and tempering the spheroidizing-annealed steel, thereby causing residual cementite grains of an average grain size ranging from 0.05 to 1.5 µm.

3. A steel according to claim 1, wherein the residual cementite means the cementite which existed before the quenching.

4. A steel having excellent rolling contact fatigue life, consisting essentially of 0.7 to 1.1% C, 0.61 to 2.0% Si, 0.4 to 2.5% Mn, 3.5 to 4.0% Cr, 0.1% or more and less than 0.5% Mo, 0.010 to 0.050% Al, by mass, and a balance of Fe and inevitable impurities; having a martensite-based microstructure caused by quenching and tempering; and having residual cementite grains of an average grain size ranging from 0.05 to 1.5 µm, and prior-austenite grains of an average grain size of 30 µm or smaller.

5. A method for manufacturing steel having excellent rolling contact fatigue life, comprising the steps of:

spheroidizing annealing a steel consisting essentially of 0.7 to 1.1% C, 0.61 to 2.0% Si, 0.4 to 2.5% Mn, 3.5 to 4.0% Cr, 0.1% or more and less than 0.5% Mo, 0.010 to 0.050% Al, by mass, and a balance of Fe and inevitable impurities, by heating to a temperature ranging from 750° C. to 850° C., and then by cooling to 700° C. or a lower temperature at a cooling rate of 0.004 to 0.015° C./s to produce a spheroidizing-annealed steel;

and heating to 800° C. to 950° C., quenching and tempering the spheroidizing-annealed steel, thereby causing residual cementite grains of an average grain size ranging from 0.05 to 1.5 µm.

6. A steel according to claim 4, wherein the Si content is 0.98 to 2.0 mass %.

7. A method for manufacturing steel according to claim 5, wherein the Si content is 0.98 to 2.0 mass %.

8. A steel having excellent rolling contact fatigue life, consisting of 0.7 to 1.1% C, 0.61 to 1.47% Si, 0.4 to 2.5% Mn, 3.5 to 4.0% Cr, 0.33% or more and less than 0.5% Mo, 0.010 to 0.050% Al, by mass, optionally at least one element selected from the group consisting of 0.5 to 2.0% Ni and 0.0010 to 0.0050% Sb, by mass, and a balance of Fe and inevitable impurities; having a martensite-based microstructure caused by quenching and tempering; and having residual cementite grains of an average grain size ranging from 0.05 to 1.5 µm, and prior-austenite grains of an average grain size of 30 µm or smaller.

9. The steel having excellent rolling contact fatigue life as in claim 4, further containing at least one element selected from the group consisting of 0.5 to 2.0% Ni, 0.05 to 1.00% V, 0.005 to 0.50% Nb and 0.0010 to 0.0050% Sb, by mass.

10. The method for manufacturing steel having excellent rolling contact fatigue life as in claim 5, wherein the steel further contains at least one element selected from the group consisting of 0.5 to 2.0% Ni, 0.05 to 1.00% V, 0.005 to 0.50% Nb and 0.0010 to 0.0050% Sb, by mass.

11. The method for manufacturing steel according to claim 5, wherein the residual cementite means the cementite which existed before the quenching.

12. The steel according to claim 9, wherein the residual cementite means the cementite which existed before the quenching.

13. The method for manufacturing steel according to claim 10, wherein the residual cementite means the cementite which existed before the quenching.

14. The steel according to claim 9, wherein the Si content is 0.98 to 2.0 mass %.

15. The method for manufacturing steel according to claim 10, wherein the Si content is 0.98 to 2.05 mass %.

* * * * *